US011050655B2

(12) United States Patent
Zeng et al.

(10) Patent No.: US 11,050,655 B2
(45) Date of Patent: Jun. 29, 2021

(54) ROUTE INFORMATION DISTRIBUTION THROUGH CLOUD CONTROLLER

(71) Applicant: Alibaba Group Holding Limited, Grand Cayman (KY)

(72) Inventors: Jun Zeng, Cupertino, CA (US); Li Han, Bellevue, WA (US); Gang Cheng, Bellevue, WA (US)

(73) Assignee: Alibaba Group Holding Limited, Grand Cayman (KY)

( * ) Notice: Subject to any disclaimer, the term of this patent is extended or adjusted under 35 U.S.C. 154(b) by 54 days.

(21) Appl. No.: 16/206,413

(22) Filed: Nov. 30, 2018

(65) Prior Publication Data

US 2020/0177489 A1    Jun. 4, 2020

(51) Int. Cl.
*H04L 12/751* (2013.01)
*H04L 12/715* (2013.01)
*H04L 12/741* (2013.01)
*H04L 12/931* (2013.01)
*H04L 12/46* (2006.01)

(52) U.S. Cl.
CPC .......... *H04L 45/02* (2013.01); *H04L 12/4641* (2013.01); *H04L 45/04* (2013.01); *H04L 45/64* (2013.01); *H04L 45/745* (2013.01); *H04L 49/354* (2013.01)

(58) Field of Classification Search
CPC ......... H04L 45/02; H04L 45/04; H04L 45/64; H04L 45/745; H04L 49/354; H04L 12/4641

USPC .......................................................... 370/392
See application file for complete search history.

(56) References Cited

U.S. PATENT DOCUMENTS

| 8,819,284 | B2  | 8/2014 | Nguyen et al. |
| 9,674,108 | B1  | 6/2017 | Ryan et al. |
| 9,712,386 | B1  | 7/2017 | Chen et al. |
| 9,954,763 | B1  | 4/2018 | Ye et al. |
| 9,986,019 | B2  | 5/2018 | Mulligan et al. |
| 2015/0188949 | A1 | 7/2015 | Mahaffey et al. |
| 2015/0200806 | A1* | 7/2015 | Donley ............... H04L 41/0816 370/392 |
| 2016/0142310 | A1* | 5/2016 | Means .................... H04L 45/74 370/392 |
| 2017/0063614 | A1* | 3/2017 | Hartwig .............. H04L 41/0886 |
| 2019/0050246 | A1 | 2/2019 | Cochran et al. |
| 2019/0182155 | A1 | 6/2019 | Chang |
| 2019/0188763 | A1 | 6/2019 | Ye et al. |

FOREIGN PATENT DOCUMENTS

WO    WO2015200012 A1    12/2015

\* cited by examiner

*Primary Examiner* — Paul H Masur
*Assistant Examiner* — Ellen A Kirillova
(74) *Attorney, Agent, or Firm* — Lee & Hayes, P.C.

(57) ABSTRACT

A provider edge device and a cloud controller are provided. The provider edge device receives route information associated with a virtual private cloud, and sends the route information to the cloud controller. In response to receiving the route information from the provider edge device, the cloud controller distributes the route information to one or more other provider edge devices of the cloud network of the service provider that includes the provider edge device.

17 Claims, 4 Drawing Sheets

ROUTE INFORMATION DISTRIBUTION THROUGH CLOUD CONTROLLER

BACKGROUND

With the development of cloud technologies, an increasing number of users are running applications and storing data in a cloud. Various cloud systems are developed to fulfill different requirements of the users. An example cloud system includes a virtual private cloud (VPC), which is a pool of on-demand shared computing resources that are configurable and allocated within a public cloud environment. VPCs allow a certain level of isolation between different users using the resources. This level of isolation is achieved by controlling data routes that are allowed between VPCs.

For example, FIG. 1 shows a hybrid cloud or network 100 based on MPLS (Multiprotocol Label Switching). When route information of a site 102 in a VPC 104 is changed (e.g., the site 102 is configured with a new address or site 102 is a new site added to the VPC 104), a provider edge device 106 attached to the VPC 104 including the site 102 needs to advertise this route information of the site 102 to other provider edge devices 108 and 110 attached to the same VPC 104 including other sites 112 and 114 to allow the other provider edge devices 108 and 110 to update the route information of the site 102. FIG. 1 also shows customer edge devices 118, 120 and 122 through which the provider edge devices 106, 108 and 110 attach to the VPC 104 and connect to the sites 102, 108 and 110 respectively. As shown in FIG. 1, the provider edge device 106 needs to send this route information of the site 102 to the other provider edge devices 108 and 110 through a cloud network 116 of a service provider that includes the provider edge device 106, the other provider edge devices 108 and 110, and a large number of other routers and/or switches 124-1, 124-2, . . . , 124-H (which are collectively called as routers 124) that are situated between the provider edge device 106 and the other provider edge devices 108 and 110, where H is a positive integer.

Since the number of routers and switches 124 in the cloud network 116 is huge and continues to increase as the cloud network 116 expands in capacity to accommodate increasing demands of users around different parts of the world, the delay in propagating route information from one provider edge device to another provider edge device increases. Such delay would cause an error in transmission of data packets to a site in a VPC if a change in route information of the site occurs and fails to notify other sites in the same VPC or provider edge devices serving these other sites in time, such that old route information is still used for sending the data packets to that site.

Furthermore, the larger the number of routers and switches 124 is, the higher the chance of losing the route information due to mishandling or failure of a router or switch in the cloud network 116 during transmission will be. Moreover, unlike transmission of a normal data packet in which a sender may receive an acknowledgement of the data packet from a receiver, a provider edge device which sends the route information may not be aware that other provider edge devices have failed to receive the route information due to the mishandling or failure of the router or switch in the cloud network 116.

Moreover, data traffic associated with route information between provider edge devices also consumes bandwidth of the cloud network of the service provider during transmission, and thus competes with data traffic of normal data packets transmitted among sites of one or more VPCs, causing delays to the data traffic of the normal data packets.

SUMMARY

This summary introduces simplified concepts of transmission of route information associated with a virtual private cloud, which will be further described below in the Detailed Description. This summary is not intended to identify essential features of the claimed subject matter, nor is it intended for use in limiting the scope of the claimed subject matter.

This application describes example implementations of transmission of route information between provider edge devices through a cloud controller. In implementations, a provider edge device receives route information associated with a virtual private cloud, and sends the route information to a cloud controller. In response to receiving the route information from the provider edge device, the cloud controller distributes the route information to one or more other provider edge devices of the cloud network of the service provider that includes the provider edge device.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
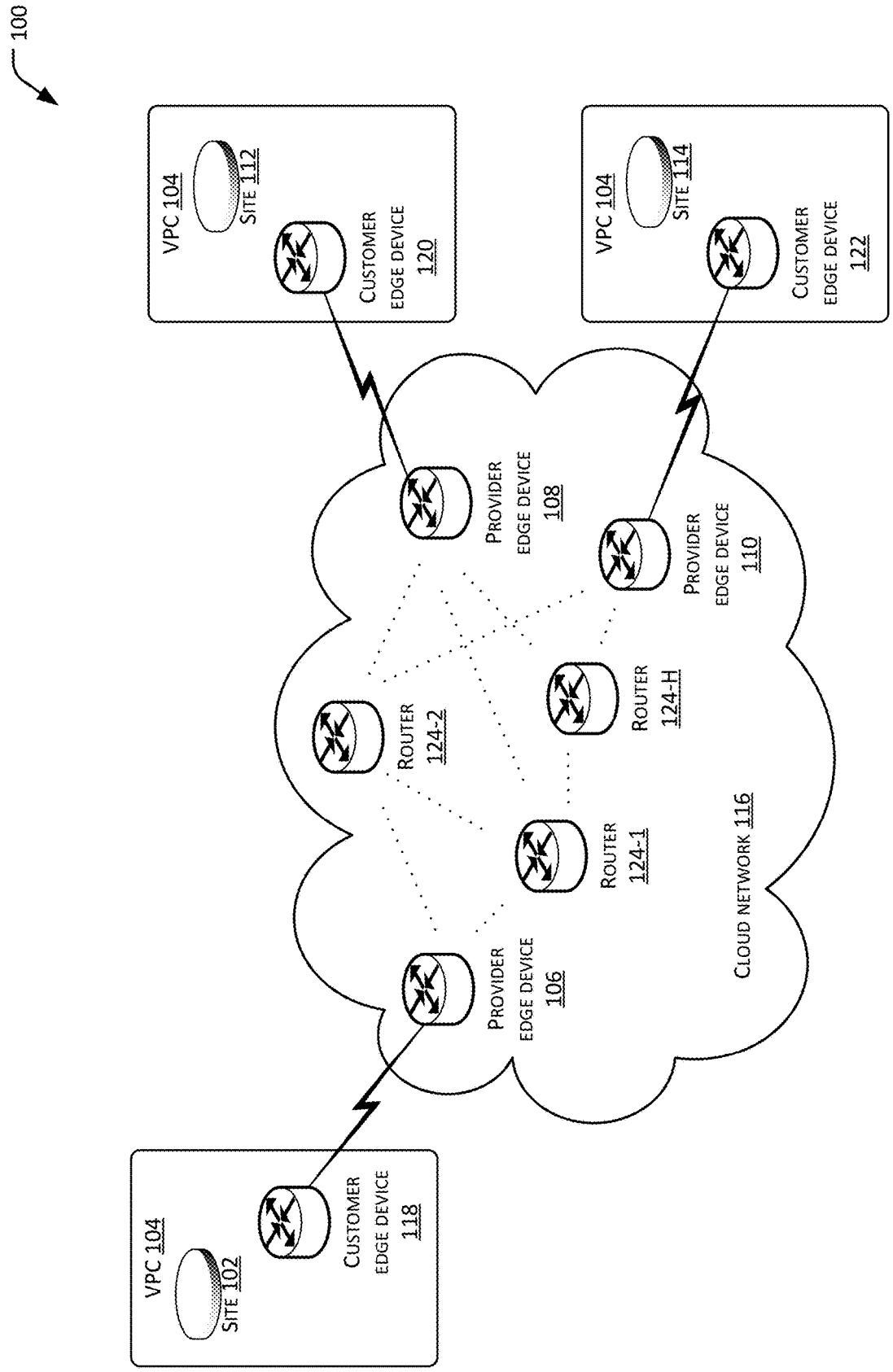
FIG. 1 illustrates a virtual private network based on MPLS (Multiprotocol Label Switching)

As noted above, existing technologies require a provider edge device to send route information associated with a virtual private cloud to other provider edge devices through a cloud network of a service provider that includes the provider edge device, the other provider edge devices, and a large number of other routers and switches that are situated between the provider edge device and the other provider edge devices. This not only incurs a delay in transmission of the route information, but is also prone to a loss of a data packet carrying the route information due to a large number of routers and switches that the data packet needs to traverse.

This disclosure describes an example route information monitoring system. The route information monitoring system includes a cloud controller located outside a cloud network of a service provider that includes a plurality of provider edge devices connected by a plurality of routers and switches. In implementations, a provider edge device of the plurality of provider edge devices receives route information associated with a virtual private cloud. The route information may be received in response to a change in one or more routes coming to or from one or more sites in the virtual private cloud to which the provider edge device attached. Upon receiving the route information, the provider edge device sends the route information to the cloud controller via a dedicated line or gateway without going through one or more routers and/or switches in the cloud network of the service provider. For example, upon receiving the route information, the provider edge device bypasses the one or more routers and/or switches in the cloud network of the service provider to send the route information to the cloud controller via the dedicated line or gateway. In response to receiving the route information from the provider edge device, the cloud controller distributes the route information to one or more other provider edge devices of the cloud network of the service provider via one or more other dedicated lines or gateways.

The described route information monitoring system allows transmission of routing information associated with a virtual private cloud between provider edge devices through a cloud controller bypassing or without going through a number of other routers and switches of a cloud network including the provider edge devices, thus avoiding a delay in the transmission of the route information due to the need of a data packet carrying the route information to traverse through a large number of routers and switches, while preventing the data packet carrying the route information from being lost due to a potential mishandling or failure in a router or switch in the cloud network through the data packet carrying the route information is traversed.

The application describes multiple and varied implementations and implementations. The following section describes an example framework that is suitable for practicing various implementations. Next, the application describes example systems, devices, and processes for implementing a route information monitoring system.

Example Environment

Figure 2:
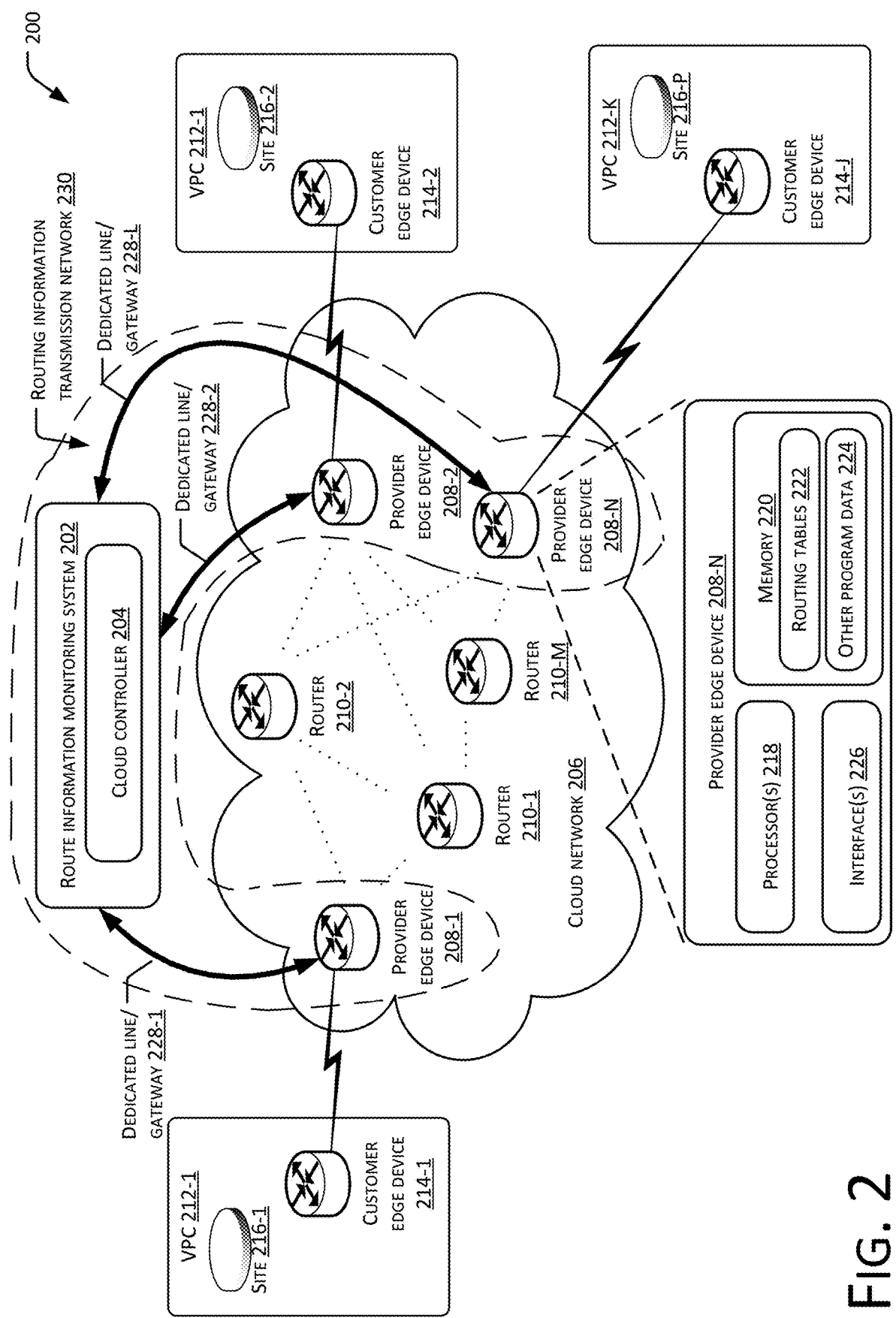
FIG. 2 illustrates an example environment in which a route information monitoring system may be used.

FIG. 2 illustrates an example environment 200 usable to implement a route information monitoring system. The environment 200 may include a route information monitoring system 202. In this example, the route information monitoring system 202 is described to include a cloud controller 204. In other instances, the route information monitoring system 202 may include a plurality of cloud controllers 204 communicating data with each other.

In implementations, the environment 200 may further include a cloud network 206 of a service provider. The cloud network 206 may include a plurality of provider edge devices 208-1, 208-2, . . . , 208-N (which are collectively called as provider edge devices 208), where N is an integer greater than one. The cloud network 206 may further include a plurality of routers and switches 210-1, 210-2 . . . , 210-M (which are collectively called as routers 210), where M is an integer greater than zero. The environment 200 may further include one or more virtual private clouds (VPCs) 212-1, . . . , 212-K (which are collectively called as virtual private clouds 210) attached to the plurality of provider edge devices 208 through a plurality of customer edge devices 214-1, 214-2, . . . , 214-J, where K and J are integers greater than one. One or more sites 216-1, 216-2, . . . , 216-P belong to the VPCs 210 respectively, where P is an integer greater than zero.

The route information monitoring system 202 may be implemented as any of a variety of computing devices including, for example, a mainframe computer, a server, a processing device, a multi-processor device, a programmable device, or a combination thereof.

The provider edge device 208 may include one or more processors 218 and memory 220. The memory 220 may be configured to store data including, but not limited to, routing tables 222 such as a virtual routing and forwarding table, a global routing table, and other program data 224. In implementations, the provider edge device 208 may further include one or more interfaces 226 to communicate with one or more customer edge devices 214 in at least one VPC 212, one or more routers and switches in the cloud network 206, and the route information monitoring system 202 (or the cloud controller 204). In implementations, a customer edge device 214 may be a routing device (such as a router) or host at premises of a customer that is connected to a provider edge device 208 of the cloud network 206, and exchanges route information associated with VPCs 212 with the provider edge device 208. A provider edge device may be a routing device (such as a router) located at the edge of the cloud network 206, and peers with one or more customer edge devices 214 to exchange route information associated with VPCs 212.

The route information monitoring system 202 (or the cloud controller 204) may be connected with the plurality of provider edge devices 208 through dedicated lines or gateways 228-1, 228-2, . . . , 228-L (which are collectively called as dedicated lines or gateways 228), where L is an integer greater than zero, e.g., equal to N. In implementations, the route information monitoring system 202 (or the cloud controller 204), the plurality of provider edge devices 208, and the dedicated lines or gateways 228 form a route information transmission network 230. In implementations, the route information transmission network 230 may be responsible for transmitting data packets conveying or advertising route information (and route-related information such as instructions to update, refresh and/or delete a certain route associated with a VPC, etc.) associated with the one or more VPCs 212 among the plurality of provider edge devices 208 only. The cloud network 206, on the other hand, may be responsible for transmitting data packets among the one or more VPCs 212, other than transmitting data packets used for conveying or advertising routing information associated with the one or more VPCs 212, etc.). In other words, the route information transmission network 230 is different from the cloud network 206, and the plurality of provider edge devices are devices that are common to both the route information transmission network 230 and the cloud network 206.

Example Route Information Monitoring System

Figure 3:
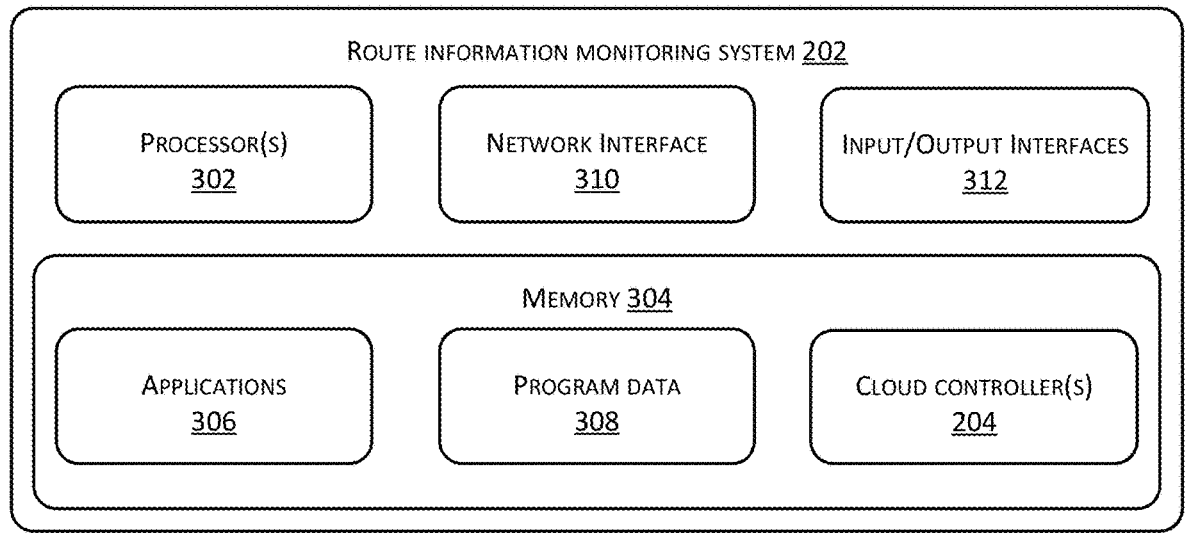
FIG. 3 illustrates the example route information monitoring system in more detail.

FIG. 3 illustrates the route information monitoring system 202 that includes the cloud controller 204 in more detail. In implementations, the route information monitoring system 202 includes, but is not limited to, one or more processors 302, memory 304, one or more applications or services 306 (e.g., a route monitoring application or service, etc.) and program data 308. In implementations, the route information monitoring system 202 may further include a network interface 310 and an input/output interface 312. The processor(s) 302 is configured to execute instructions received from the network interface 310, received from the input/output interface 312, and/or stored in the memory 304. Additionally or alternatively, some or all of the functionalities of the cloud controller 204 may be implemented using an ASIC (i.e., Application-Specific Integrated Circuit), a FPGA (i.e., Field-Programmable Gate Array), or other hardware provided in the route information monitoring system 202.

As discussed above, in some implementations, the route information monitoring system 202 may include a plurality of cloud controllers 204 distributed among the route information transmission network 224. In that case, each of the cloud controllers 204 may be responsible for communicating and processing route information with a subset of the plurality of provider edge devices 208 that are in closest proximity as compared to the other cloud controllers 204, or may be responsible for communicating and processing route information associated with a subset of VPCs 212. In either case, the cloud controller 204 may communicate route information with other cloud controllers 204 for processing.

The memory 304 may include computer-readable media in a form of volatile memory, such as Random Access Memory (RAM) and/or non-volatile memory, such as read only memory (ROM) or flash RAM. The memory 304 is an example of computer-readable media.

The computer readable media may include a volatile or non-volatile type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

Although in this example, the cloud controller 204 is described to be included in the memory 304, in other instances, the cloud controller 204 can exist as a hardware component or device that is a part of the route information monitoring system 202. In that case, the cloud controller 204 may include one or more processors, one or more network interfaces, one or more input/output interfaces, and/or memory, etc.

Without loss of generality, the VPC 212-1 is used hereinafter as an example of a VPC in which route information of a site (e.g., the site 216-1) therein needs to be advertised or distributed by a provider edge device 208 (e.g., the provider edge device 208-1) to one or more other provider edge devices 208 (e.g., the provider edge device 208-2, etc.) that are also attached to the VPC 212-1. It is noted, however, that the present disclosure is not limited thereto and can be applied to other VPCs, such as VPC 212-K, etc. Furthermore, without loss of generality, the provider edge device 208-1 is merely used as an example of a provider edge device that receives the route information of the site to be advertised or distributed from a customer edge device connected thereto, and the present disclosure is not limited thereto and can be applied to other provider edge devices, such as provider edge device 208-N, etc.

Example Method

Figure 4:
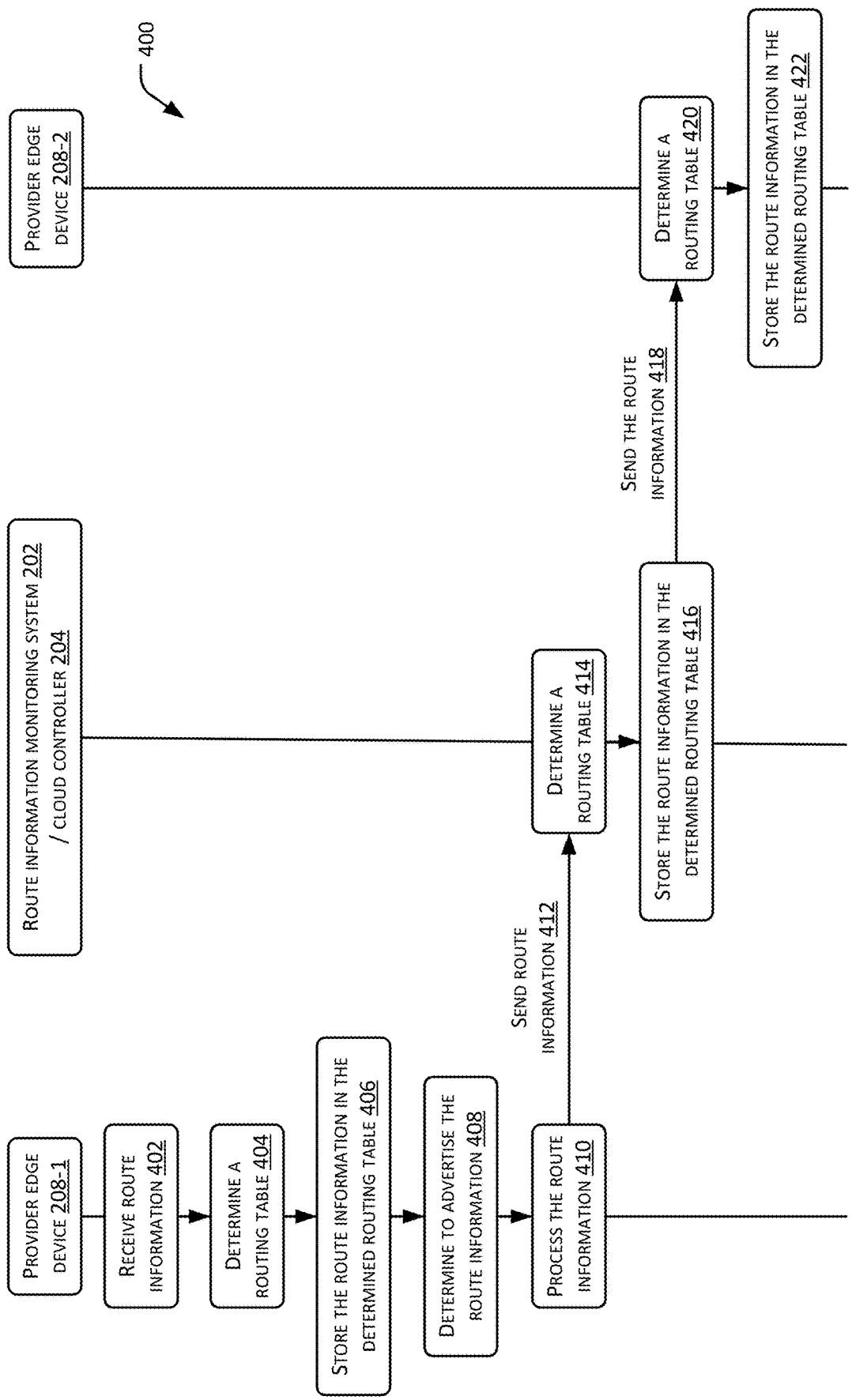
FIG. 4 illustrates an example method of transmission of route information associated with a virtual private cloud.

FIG. 4 is a schematic diagram depicting a method of transmitting route information between provider edge devices through the route information monitoring system 202 or the cloud controller 204. The method of FIG. 4 may, but need not, be implemented in the environment of FIG. 2 and using the system of FIG. 3. For ease of explanation, method 400 described with reference to FIGS. 2-3. However, the method 400 may alternatively be implemented in other environments and/or using other systems.

Method 400 is described in the general context of computer-executable instructions. Generally, computer-executable instructions can include routines, programs, objects, components, data structures, procedures, modules, functions, and the like that perform particular functions or implement particular abstract data types. Furthermore, the example method is illustrated as a collection of blocks in a logical flow graph representing a sequence of operations that can be implemented in hardware, software, firmware, or a combination thereof. The order in which the method is described is not intended to be construed as a limitation, and any number of the described method blocks can be combined in any order to implement the method, or alternate methods. Additionally, individual blocks may be omitted from the method without departing from the spirit and scope of the subject matter described herein. In the context of software, the blocks represent computer instructions that, when executed by one or more processors, perform the recited operations. In the context of hardware, some or all of the blocks may represent application specific integrated circuits (ASICs) or other physical components that perform the recited operations.

Referring back to FIG. 4, at block 402, the provider edge device 208-1 receives route information of the site 216-1 in the VPC 212-1 to which the provider edge device 208-1 is attached through the customer edge device 214-1. The route information of the site 216-1 is received in response to a change in an address of the site 216-1, or when the site 216-1 is a new site currently added to the VPC 212-1.

At block 404, the provider edge device 208-1 may determine a routing table, for example, a virtual routing and forwarding table, to store the route information of the site 216-1. In implementations, the provider edge device 208-1 may be attached to one or more VPCs through one or more customer edge devices. In that case, the provider edge device 208-1 may include one or more routing tables (e.g., one or more virtual routing and forwarding tables).

Additionally or alternatively, the provider edge device 208-1 may include one or more virtual routing and forwarding instances. Each VPC that is attached to the provider edge device 208-1 has one or more corresponding virtual routing and forwarding tables and/or virtual routing and forwarding instances, which are not shared by other VPCs. When the provider edge device 208-1 receives the routing information of the site 216-1 in the VPC 212-1, the provider edge device 208-1 searches for a routing table (e.g., a virtual routing and forwarding table and/or a virtual routing and forwarding instance) corresponding to the VPC 212-1.

In implementations, since a customer edge device belongs to a single VPC only, the provider edge device 208-1 may determine a VPC (i.e., the VPC 212-1 in this example) the site 216-1 belongs to (or the route information of the site 216-1 comes from) based on from which customer edge device (i.e., the customer edge device 214-1 in this example) this route information of the site is received by the provider edge device 208-1. Additionally or alternatively, each VPC may be assigned or associated with a unique identifier, which can distinguish the respective VPC from other VPCs. This unique identifier of the VPC may be added to or included in the route information of the site 216-1 when this route information is sent from the site 216-1, or when the route information of the site 216-1 is passed through the customer edge device 208-1, for example.

At block 406, the provider edge device 208-1 may store the routing information of the site 216-1 into the routing table that is found.

At block 408, the provider edge device 208-1 may determine that the route information of the site 216-1 needs to be advertised or distributed to other provider edge devices. For example, the provider edge device 208-1 may determine that the route information needs to be advertised or distributed to other provider edge devices in response to determining that the route information is received from the VPC to which the provider edge device 208-1 is attached (e.g., the route information is received from a customer edge device connected to the provider edge device 208-1).

In some instances, route information of a site that is not attached to the provider edge device 208-1 is received at the provider edge device 208-1. In that case, the provider edge device 208-1 may store the received route information if a corresponding routing table (such as a virtual routing and forwarding table and/or a virtual routing and forwarding instance) is locally found in the provider edge device 208-1, or discard the received routing information without storing thereof if no corresponding routing table is found. Additionally or alternatively, the provider edge device 208-1 may create a new routing table and store the received route information in the new routing table if a corresponding VPC is determined to be attached to the provider edge device 208-1, or discard the received route information without storing thereof if no corresponding VPC is found. In either case, the provider edge device 208-1 may not advertise or distribute this route information thereafter.

At block 410, after determining that the route information needs to be advertised or distributed to other provider edge devices 208 of the cloud network 206, the provider edge device 208-1 may process the route information to be advertised or distributed prior to sending the route information. Since sites of two different VPCs connected to the cloud network 206 may have a same address (e.g., a same private address is used internally for sites in different VPCs), the provider edge device 208-1 needs to ensure that route information of a site in a VPC that is to be sent or advertised does not conflict with route information of sites of any other VPCs, or route information of another site may be accidentally overwritten due to the sending of this route information of the site. Furthermore, since each VPC connected to the cloud network 206 may employ a protocol for data communication or transmission that is different from those of other VPCs, and the provider edge device 208-1 also needs to accommodate VPCs using different communication or transmission protocols.

In implementations, the provider edge device 208-1 may employ a border gateway protocol or scheme that allows or supports multiple communication or transmission protocols. In implementations, the provider edge device 208-1 may employ a Multiprotocol Extensions for Border Gateway Protocol (MP-BGP), and sends route information using the MP-BGP.

Furthermore, in order to uniquely distinguish each site from other sites among different VPCs, the provider edge device 208-1 may convert the route information or the address of the site 216-1 that is received into a new address according to a designated address conversion scheme. This designated address conversion scheme may, but not limited to, add additional information to private or internal addresses of sites of VPCs, so that a site can be distinguished from another site even if these two sites have a same internal or private address in corresponding VPCs. In implementations, the provider edge device 208-1 may further store a new address of the site 216-1 in correspondence with a private address of the site 216-1 in the routing table (e.g., the routing and forwarding table and/or the routing and forwarding instance) associated with the VPCs 212-1 in which the site 216-1 is located. This enables conversion between the new address of the site 216-1 that is used in the route information transmission network 230 (and the cloud network 206 when normal data packets are transmitted) and the address of the site that is internally used in the VPC 212-1. By way of example and not limitation, the additional information may include a new identifier that uniquely represents or identifies a VPC from among different VPCs 212 connected to the cloud network 206. An example of the designated address conversion scheme may include, but is not limited to, VPN-IPv4. In an event that VPN-IPv4 is used, the additional information corresponds to a route distinguisher that identifies a VPC.

In implementations, the provider edge device 208-1 may convert an address of the site 216-1 in the route information to a VPN-IPv4 address that includes an identifier representing the VPC 212-1 including the site 216-1 and an address of the site 216-1 that is used internally in the VPC 212-1. Although in this example, MP-BGP and VPN-IPv4 are described and used, other communication protocols and address conversion schemes may also be used based on configurations of a cloud network and VPCs connected to the cloud network.

At block 412, the provider edge device 208-1 may send out the route information. In implementations, instead of sending the route information to other provider edge devices (such as the provider edge device 208-2, etc.) through the plurality of routers 210 in the cloud network 206, the provider edge device 208-1 sends the route information to the route information monitoring system 202 (or the cloud controller 204). In implementations, the provider edge device 208-1 may send the route information to the route information monitoring system 202 (or the cloud controller 204) through the route information transmission network 230 via the dedicated line or gateway 228-1, for example, thus avoiding an excessive delay and a potential packet drop due to sending the route information through the plurality of routers 210 in the cloud network 206.

At block 414, in response to receiving the route information sent from the provider edge device 208-1, the route information monitoring system 202 (or the cloud controller 204) may determine a routing table to store the received route information. In implementations, the route information monitoring system 202 (or the cloud controller 204) may include or store a plurality of different routing tables corresponding to a plurality of different virtual private clouds. The route information monitoring system 202 (or the cloud controller 204) may extract the VPC identifier from the data packet including or carrying the route information to determine a VPC that the route information is associated with.

At block 416, upon determining the VPC identifier, the route information monitoring system 202 (or the cloud controller 204) may add or store received the route information into a routing table corresponding to the determined VPC.

At block 418, the route information monitoring system 202 (or the cloud controller 204) may send or distribute the route information to one or more other provider edge devices 208 (such as the provider edge device 208-2, etc.) of the cloud network 206. In implementations, the route information monitoring system 202 (or the cloud controller 204) may send the route information to the one or more other provider edge devices 108 through the route information transmission network 230 via one or more other dedicated lines or gateways 228.

In implementations, the route information monitoring system 202 (or the cloud controller 204) may send the route information that is received to the one or more other provider edge devices 208 by replacing a destination address of the original data packet including the route information with respective addresses of the one or more other provider edge devices 208. In other implementations, the route information monitoring system 202 (or the cloud controller 204) may send the route information to the one or more other provider edge devices 208 by generating new data packets including the route information with destination addresses being the respective addresses of the one or more other provider edge devices 208.

At block 420, the provider edge device 208-2 may receive the data packet including the route information from the route information monitoring system 202 (or the cloud controller 204) through the route information transmission network 230. In response to receiving the route information, the provider edge device 208-2 may determine a routing table into which the received route information is added or stored. This can be performed in a way similar to the method described in block 404.

At block 422, in an event that the routing table corresponding to the received route information is found (or newly created) in the provider edge device 208-2, the provider edge device 208-2 may add or store the received route information in the found (or newly created) routing table to complete the transmission of the route information associated with the site 216-1.

Any of the acts of any of the methods described herein may be implemented at least partially by a processor or other electronic device based on instructions stored on one or more computer-readable media. By way of example and not limitation, any of the acts of any of the methods described herein may be implemented under control of one or more processors configured with executable instructions that may be stored on one or more computer-readable media.

Conclusion

Although implementations have been described in language specific to structural features and/or methodological acts, it is to be understood that the claims are not necessarily limited to the specific features or acts described. Rather, the specific features and acts are disclosed as exemplary forms of implementing the claimed subject matter. Additionally or alternatively, some or all of the operations may be implemented by one or more ASICS, FPGAs, or other hardware.

The present disclosure can be further understood using the following clauses.

Clause 1: A method comprising: receiving, by a first provider edge device of a cloud network of a service provider, route information associated with a virtual private cloud, the first provider edge device being attached to the virtual private cloud; and sending, by the first provider edge device, the route information to a cloud controller that is configured to receive the route information and distribute the route information to one or more second provider edge devices of the cloud network of the service provider.

Clause 2: The method of Clause 1, further comprising storing the route information in a virtual forwarding table associated with the first provider edge device.

Clause 3: The method of Clause 1, wherein the route information associated with the virtual private cloud is received in response to a change in one or more routes coming to or from one or more sites in the virtual private cloud.

Clause 4: The method of Clause 1, wherein the route information is sent to the cloud controller according to a border gateway protocol.

Clause 5: The method of Clause 1, wherein the route information is represented as a VPN-IPv4 address.

Clause 6: The method of Clause 1, wherein sending the route information to the cloud controller comprises: examining the route information received by the first provider edge device; determining that the route information needs to be forwarded to the one or more second provider edge devices; changing a destination address of a data packet including the route information to an address of the cloud controller; and sending the data packet to the cloud controller.

Clause 7: The method of Clause 1, sending the route information to the cloud controller comprises: examining the route information received by the first provider edge device; determining that the route information needs to be forwarded to the one or more second provider edge devices; generating a data packet including the route information with a destination address as an address of the cloud controller; and sending the data packet to the cloud controller.

Clause 8: A cloud controller comprising: one or more processors; memory storing executable instructions that, when executed by the one or more processors, cause the one or more processors to perform acts comprising: receiving route information associated with a virtual private cloud from a first provider edge device of a cloud network comprising a plurality of routers and switches; and distributing the route information to one or more second provider edge devices bypassing or without going through the plurality of routers and switches.

Clause 9: The cloud controller of Clause 8, the acts further comprising determining a routing table associated with the virtual private cloud from among a plurality of different routing tables corresponding to a plurality of different virtual private clouds.

Clause 10: The cloud controller of Clause 9, the acts further comprising storing the route information in the routing table associated with the virtual private cloud.

Clause 11: The cloud controller of Clause 8, wherein the cloud controller is connected to the first provider edge device through a dedicated line.

Clause 12: The cloud controller of Clause 8, wherein the route information is received according to a border gateway protocol.

Clause 13: The cloud controller of Clause 8, wherein the route information is received in response to a change in one or more routes coming to or from one or more sites in the virtual private cloud.

Clause 14: One or more storage devices storing executable instructions that, when executed by a first provider edge device, cause the first provider edge device to perform acts comprising: receiving route information associated with a virtual private cloud; and sending the route information to a cloud controller that is configured to receive the route information and distribute the route information to one or more second provider edge devices of a cloud network of a service provider including the first provider edge device.

Clause 15: The one or more storage devices of Clause 14, the acts further comprising storing the route information in a virtual forwarding table associated with the first provider edge device.

Clause 16: The one or more storage devices of Clause 14, wherein the route information associated with the virtual private cloud is received in response to a change in one or more routes coming to or from one or more sites in the virtual private cloud.

Clause 17: The one or more storage devices of Clause 14, wherein the route information is sent to the cloud controller according to a border gateway protocol.

Clause 18: The one or more storage devices of Clause 14, wherein the route information is represented as a VPN-IPv4 address.

Clause 19: The one or more storage devices of Clause 14, wherein sending the route information to the cloud controller comprises: examining the route information received by the first provider edge device; determining that the route information needs to be forwarded to the one or more second provider edge devices; changing a destination address of a data packet including the route information to an address of the cloud controller; and sending the data packet to the cloud controller.

What is claimed is:

1. A method comprising:
receiving, by a first provider edge device of a cloud network, route information associated with a virtual private cloud via a route information transmission network in response to a change in one or more routes coming to or from one or more sites in the virtual private cloud, the first provider edge device being attached to the virtual private cloud, the route information transmission network being a different network from the cloud network, the route information transmission network comprising:
the first provider edge device,
a route information monitoring system storing the route information, and
a dedicated line connecting the first provider edge device and a cloud controller; and
sending, by the first provider edge device via the dedicated line, the route information to the cloud controller that is configured to receive the route information and distribute the route information to one or more second provider edge devices of the cloud network.

2. The method of claim 1, further comprising storing the route information in a virtual forwarding table associated with the first provider edge device.

3. The method of claim 1, wherein the route information is sent to the cloud controller according to a border gateway protocol.

4. The method of claim 1, wherein the route information is represented as a VPN-IPv4 address.

5. The method of claim 1, wherein sending the route information to the cloud controller comprises:
examining the route information received by the first provider edge device;
determining that the route information needs to be forwarded to the one or more second provider edge devices;
changing a destination address of a data packet including the route information to an address of the cloud controller; and
sending the data packet to the cloud controller.

6. The method of claim 1, sending the route information to the cloud controller comprises:
examining the route information received by the first provider edge device;
determining that the route information needs to be forwarded to the one or more second provider edge devices;
generating a data packet including the route information with a destination address as an address of the cloud controller; and
sending the data packet to the cloud controller.

7. A cloud controller comprising:
one or more processors; and
memory storing executable instructions that, when executed by the one or more processors, cause the one or more processors to perform acts comprising:
receiving, via a route information transmission network in response to a change in one or more routes coming to or from one or more sites in a virtual private cloud, route information associated with the virtual private cloud from a first provider edge device of a cloud network comprising a plurality of routers, the route information transmission network being a different network from the cloud network, the route information transmission network comprising:
the first provider edge device,
a route information monitoring system storing the route information, and
a dedicated line connecting the first provider edge device and the cloud controller; and
bypassing the plurality of routers to distribute the route information to one or more second provider edge devices.

8. The cloud controller of claim 7, wherein the acts further comprise:
determining a routing table associated with the virtual private cloud from among a plurality of different routing tables corresponding to a plurality of different virtual private clouds.

9. The cloud controller of claim 8, wherein the acts further comprise:
storing the route information in the routing table associated with the virtual private cloud.

10. The cloud controller of claim 7, wherein the route information is received according to a border gateway protocol.

11. The cloud controller of claim 7, wherein the route information is as a VPN-IPv4 address.

12. One or more storage devices storing executable instructions that, when executed by a first provider edge device of a cloud network, cause the first provider edge device to perform acts comprising:
receiving route information associated with a virtual private cloud via a route information transmission network in response to a change in one or more routes coming to or from one or more sites in the virtual private cloud, the route information transmission network being a different network from the cloud network, the route information transmission network comprising:
the first provider edge device,
a route information monitoring system storing the route information, and
a dedicated line connecting the first provider edge device and a cloud controller; and
sending the route information to the cloud controller that is configured to receive the route information and distribute the route information to one or more second provider edge devices of the cloud network of a service provider including the first provider edge device.

13. The one or more storage devices of claim 12, the acts further comprising storing the route information in a virtual forwarding table associated with the first provider edge device.

14. The one or more storage devices of claim 12, wherein the route information is sent to the cloud controller according to a border gateway protocol.

15. The one or more storage devices of claim 12, wherein the route information is represented as a VPN-IPv4 address.

16. The one or more storage devices of claim 12, wherein sending the route information to the cloud controller comprises:

examining the route information received by the first provider edge device;

determining that the route information needs to be forwarded to the one or more second provider edge devices;

changing a destination address of a data packet including the route information to an address of the cloud controller; and sending the data packet to the cloud controller.

17. The one or more storage devices of claim 12, sending the route information to the cloud controller comprises:

examining the route information received by the first provider edge device;

determining that the route information needs to be forwarded to the one or more second provider edge devices;

generating a data packet including the route information with a destination address as an address of the cloud controller; and sending the data packet to the cloud controller.

* * * * *